Figure 3:
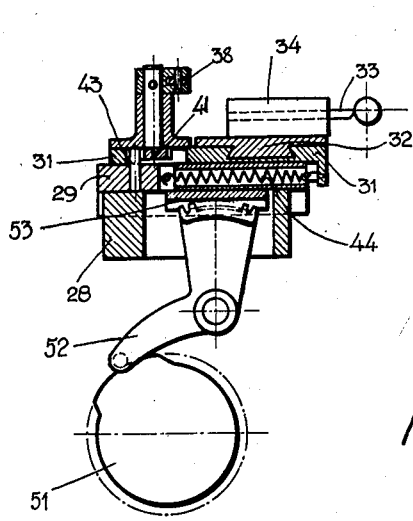

June 13, 1950 G. E. CUTTAT 2,511,196
THREADING APPARATUS FOR AUTOMATIC LATHES
Filed Jan. 22, 1947 2 Sheets-Sheet 1
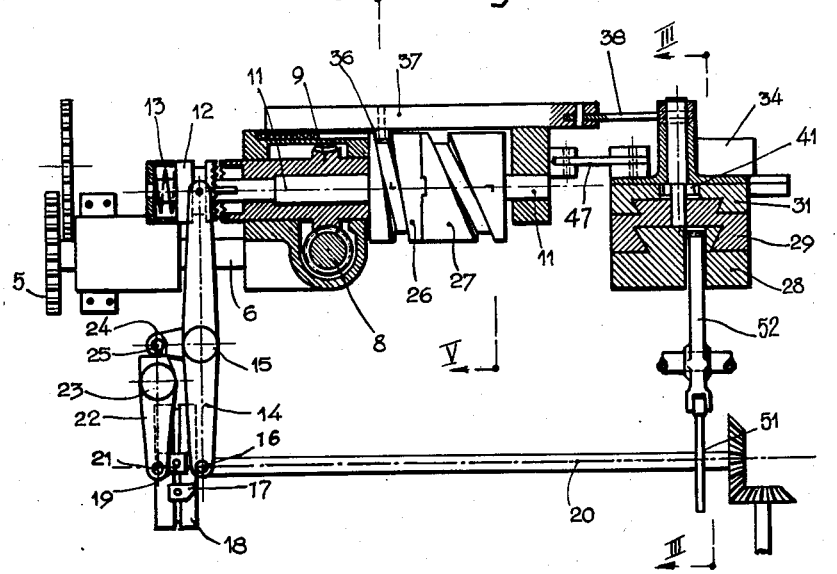
INVENTOR
Georges Emile Cuttat
By Robert E. Burns
ATTORNEY June 13, 1950          G. E. CUTTAT          2,511,196

THREADING APPARATUS FOR AUTOMATIC LATHES

Filed Jan. 22, 1947          2 Sheets-Sheet 2

INVENTOR
Georges Emile Cuttat
By Robert E. Burns
ATTORNEY

Patented June 13, 1950

2,511,196

UNITED STATES PATENT OFFICE 2,511,196

THREADING APPARATUS FOR AUTOMATIC LATHES

Georges Emile Cuttat, Geneva, Switzerland, assignor to Manufacture de Machines du Haut-Rhin, a company of France Application January 22, 1947, Serial No. 723,595
In France November 23, 1945

Section 1, Public Law 690, August 8, 1946
Patent expires November 23, 1965

1 Claim. (Cl. 10—101)

The present invention concerns automatic lathes in which the work to be threaded, taken in the bar or mounted on the spindle, turns always in the same direction, while the screw tool or comb goes through a cycle of displacements with respect to this work piece; approaching the tool, or entrance, transverse to the work, displacement parallel to the work to effect a run, and removal of the work from the tool, or exit, transverse to the work, the threading being obtained by a succession of runs.

In automatic lathes of this type, to date, the displacements of the tool are controlled by means of a guide or "pattern," threaded, whose profile has been carefully determined for each value of the threading pitch to be obtained. Therefore, as many patterns are required as there are thread pitches, with a nut corresponding to each pattern. Furthermore, the transmissions between the pattern and the tool are fairly complicated and of a not very mechanical nature, so that they are poorly adapted to the high lathe speeds.

In the arrangement according to the present invention, the various screw pitches are obtained, not by means of patterns, but by means of interchangeable gear trains allowing the variation, with respect to the piece to be threaded, of the velocity of a cam which imparts to the tool its threading displacement, parallel to the work.

Under such conditions, without any need of a multiplicity of patterns, and in a manner much more mechanical than was the case heretofore, all kinds of pitches are obtained with a single cam, for the same length of threading.

Preferably, the control device will comprise three cams, two of which, co-axially arranged, will cause, one, the putting in position of the tool (entrance and exit), the other one, the one alluded to above, the threading, by a parallel displacement to the work, while the third cam allows the determination of the accurate diameter of the thread and is also designed according to the number of runs.

The first of these cams, the one causing the entrance and exit, is invariable. The second one, which is movable, is variable only along the length of the threading to be obtained, and, as to the third one, which is used to determine the accurate diameter of the thread, it is designed in each case according to this diameter and to the number of runs required, in accordance with the material to be threaded.

Figure 4:
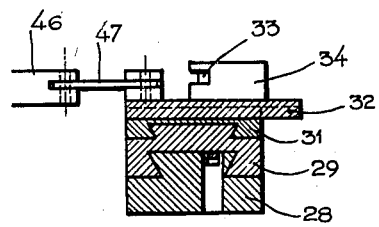
Figure 6:
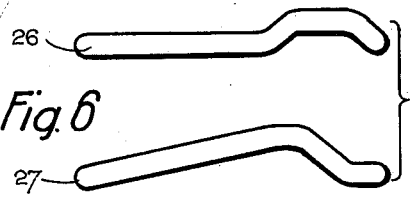
Figure 5:
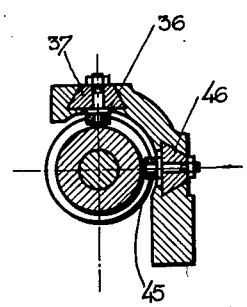
Figure 7:
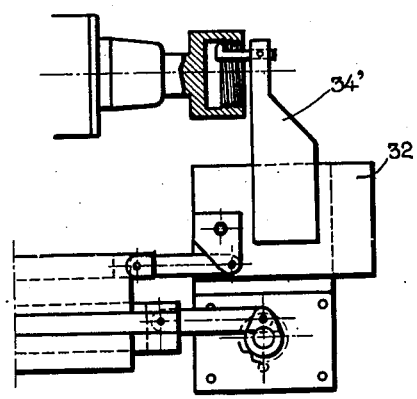

Various other characteristics of the control device according to the present invention will be apparent from the description, hereunder, of several modes of realisation, chosen by way of examples and represented, schematically, on the appended drawings, in which:

Figure 1 is an elevation,
Figure 2 is a plan view,
Figure 3 is a section along line III—III of Figure 1;
Figure 4 is a section along line IV—IV of Figure 2;
Figure 5 is a section along line V—V of Figure 1;
Figure 6 shows, in plan, the development of the positioning and threading cams;
Figure 7 is a partial view showing, in a manner similar to Figure 2, a variant for inside threading, and
Figure 8 is a schematic view relative to a threading with an inversed pitch.

The work-carrying spindle (Figure 2), through gears 2, 3, 4, 5 drives a shaft 6 which, by means of a conical pair 7, rotates an endless screw 8, meshing with a hollow wheel 9 (Figure 1), inside which the driving shaft 11 is capable of turning without sliding. A coupling element with clutches 12 allows the associating of shaft 11 with hollow wheel 9. This coupling element is biassed in the direction of engagement, by a spring 13, but it is held back by a lever 14, pivoted at 15, and provided, at its other end, with a thrust block 16 arranged in the path of a hooked cam 17, fixed on a drum 18, carrying also a hooked cam 19 located at an appropriate distance from hooked cam 17 and acting on a thrust block 21, carried by a lever 22, pivoted at 23, and having a hook 24, capable of hooking a peg 25 on an appendage of arm 14. Drum 18 is mounted on cam shaft 29 of the lathe.

It will be understood that, when the threading operation is to begin, hook 19, meeting thrust block 21, displaces lever 22, which unhooks peg 25. Lever 14, thus released, causes, under the action of spring 13, the putting in gear of coupling element 12 as well as the rotation of driving shaft 11. The threading operation being completed, hook 17, whose angular position has been determined in an appropriate manner with respect to hook 19, removes the coupling and reestablishes the hooking of hook 24 with peg 25.

Gears 2 and 3 have an invariable mutual ratio, while gears 4 and 5 can be changed to give different ratios, which allows a variation of the number of turns of the driving shaft 11 with respect to the number of turns of spindle 1 and, thus, the determination of the pitch for screw threads having one or more threads.

On driving shaft 11 are keyed two cams, 26 and 27. Cam 26, which is invariable, is the cam for putting in position of the tool, effecting the entrance and exit of this tool. Interchangeable cam 27 is the threading cam, determining the longitudinal motion of the tool with respect to the work.

A fixed slide 28 (Figs. 1, 3, 4) guides the transverse displacement with respect to the work of slide block 29 for depth adjustment. On slide block 29, and parallel to it, slide block 31 or positioning slide blocks can slide, (see also Figure 2). Finally, another slide block 32 or threading slide block, is capable of a longitudinal displacement with respect to slide block 31, i. e. parallel to the work. It carries tool 33 mounted in its tool holder 34 for outside threading. It could also carry, in its tool holder 34' (Figure 7), a tool for inside threading.

The connections between cams 26 and 27 and slide blocks 31 and 32 are effected in the following manner (see also Figure 5).

The groove of cam 26 is engaged by a roller 36 associated with a slide 37 which, through connecting rod 38 causes the rotation of a cam 41. This cam bears a notch 42 while slide block 29 bears a peg 43, capable, under the action of a tension spring 44 (Figure 3), attached at an end to slide block 29 and, at the other end to slide block 31, of entering this notch when said notch is facing it. It is clear, therefore, that when notch 42, owing to the displacement of cam 41 caused by cam 26 coincides with peg 43, slide block 31 will move slightly with respect to slide block 29, which corresponds to the withdrawal of the tool.

The groove of cam 27 engages a roller 45 (Figure 5), associated with a slide 46, which controls the threading tool 33 through connecting rod 47 (Figure 4), articulated to slide block 32. It will be apparent, therefore, that the rotation of cam 27 will thus cause longitudinal displacements of the tool with respect to the work end and, consequently, the threading.

Finally (Figs. 1 and 3), the third control cam 51, or depth adjustment cam, is fixed on cam shaft 20. This cam is used to locate adequately slide block 29 with respect to fixed slide 28 so as to determine correctly, according to the diameter of the thread and the number of runs, the starting point of the operation cycle determined by cams 26 and 27. Cam 51, through a bell crank lever 52, fitted with a toothed sector, acts on a rack 53 associated with slide block 29. Micrometric thrust blocks, not shown, determine accurately the position of the tool with respect to the work. The profile of cam 51 will be determined in accordance with the diameter of the thread and the number of runs to be effected by the tool.

Figure 6 will make it possible to understand the cycle of operations caused during a complete turn by positioning cam 26 and threading cam 27. Going through from left to right and starting from the left end, it will be seen that while the groove of cam 27 goes up, causing the threading, the groove of cam 26 has no effect. Then, the groove of cam 26 goes up, causing the withdrawing of the tool, while the groove of cam 26 is idle. Then comes a period during which the groove of cam 26 is idle while the groove of cam 27 pulls back the tool without engaging the work, and finally the groove of cam 26 causes the entrance of the tool, while the groove of cam 27 is idle.

Figure 8 makes it possible to understand that it would be easy, with the controlling device according to the present invention, to produce inverse threads; it would be sufficient to reverse the groove of cam 27. The rectangle with little arrows of Figure 8 shows schematically what the cycle of operations would be in that case.

What I claim is:

A device for the control of the threading tool for automatic lathes with a main cam shaft and a work carrying spindle, comprising a shaft, an interchangeable gearing rotatively connecting said work carrying spindle and said shaft, a first invariable cam freely mounted on said shaft, means actuated by said first invariable cam and adapted to advance and withdraw the threading tool perpendicularly to the work, a second interchangeable cam freely mounted on said shaft coaxially with said first cam, means actuated by said second cam and adapted to displace the threading tool parallel to the work, a coupling device mounted on said shaft and adapted temporarily to couple said cams with said shaft, a third cam fixed on the main cam shaft, means actuated by said third cam and adapted to control the depth of attack of the tool on the work, and means also controlled by said main shaft and temporarily actuating said coupling device.

GEORGES EMILE CUTTAT.

REFERENCES CITED

The following references are of record in the file of this patent:

UNITED STATES PATENTS

| Number | Name | Date |
|---|---|---|
| 852,641 | Vogelsang | May 7, 1907 |
| 1,277,801 | Whitehouse | Sept. 3, 1918 |
| 1,825,171 | Arnold | Sept. 29, 1931 |
| 2,084,898 | Eckardt | June 22, 1937 |

FOREIGN PATENTS

| Number | Country | Date |
|---|---|---|
| 334,489 | Great Britain | Sept. 4, 1930 |
| 419,241 | Great Britain | Nov. 8, 1934 |
| 480,563 | Great Britain | Feb. 24, 1938 |